United States Patent [19]

Taylor

[11] 4,353,221

[45] Oct. 12, 1982

[54] TRANSPORT REFRIGERATION SYSTEM

[75] Inventor: David H. Taylor, Bloomington, Minn.

[73] Assignee: Thermo King Corporation, Minneapolis, Minn.

[21] Appl. No.: 226,952

[22] Filed: Jan. 21, 1981

[51] Int. Cl.³ .............................................. B60H 3/04
[52] U.S. Cl. .................................... 62/239; 62/324.6
[58] Field of Search ..................... 62/159, 160, 324.7, 62/239

[56] References Cited

U.S. PATENT DOCUMENTS 3,365,902 1/1968 Nussbaum ......................... 62/160 X
3,421,339 1/1969 Volk et al. ............................ 62/159
3,768,274 10/1973 Fink ..................................... 62/159

Primary Examiner—Lloyd L. King
Attorney, Agent, or Firm—E. C. Arenz

[57] ABSTRACT

A transport refrigeration system of the type which can provide either cooling or heating includes a pressure regulating valve 42 controlling hot gas to the evaporator during a heating cycle and operable to prevent an excessive suction pressure, and a pressure regulating valve 74 between the two outlet sides of a three-way valve and operable to pass refrigerant from the hot gas line 34 to the condenser 30 when the hot gas pressure is excessive, the arrangement limiting the values of both the evaporator suction pressure and the hot gas discharge pressure to prevent overloading in heating and defrost operations.

3 Claims, 1 Drawing Figure

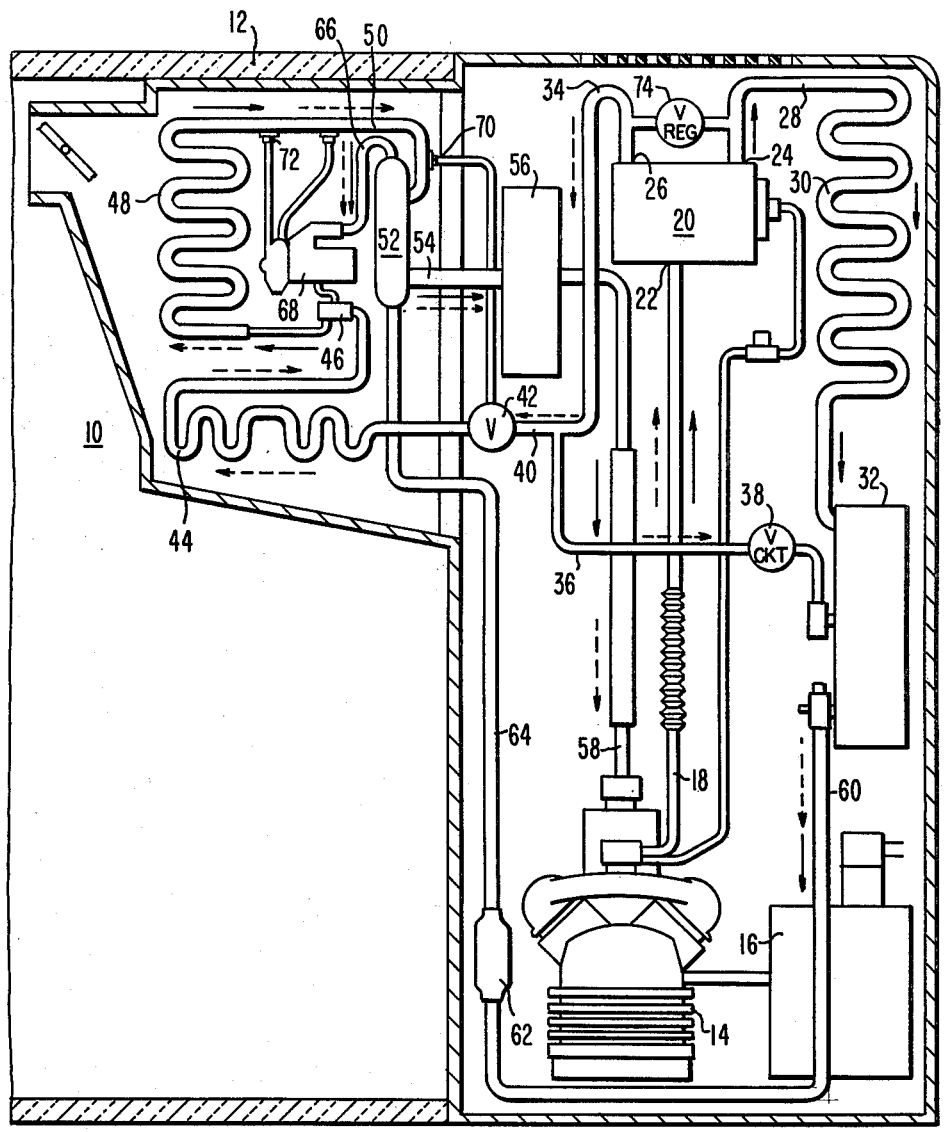

TRANSPORT REFRIGERATION SYSTEM

BACKGROUND OF THE INVENTION

1. Field of the Invention

This invention pertains to the art of transport refrigeration systems of the type adapted to selectively provide either cooling or heating operations, and in particular to a refrigeration system arrangement in which overloading of the prime mover is prevented during heating and defrost operations.

2. Description of the Prior Art

In one type of typical transport refrigeration unit currently on the market, and which is used for both cooling or heating depending upon the interior box temperature to be maintained, the refrigerant expansion valve in the line to the coil providing heat exchange within the box is of the pressure limiting type so as to limit the suction pressure in the cooling mode of operation. This expansion valve is effectively bypassed in a heating or defrost mode of operation so that it cannot limit the suction pressure. Accordingly, a throttling valve, sometimes also called a suction hold-back valve or a crankcase pressure regulating valve, is provided in the suction line to the compressor to regulate the amount of refrigerant returning to the compressor. By controlling the amount of the returning refrigerant, the load can be controlled in the heating and defrost modes of operation so that the prime mover for the compressor is not overloaded under adverse conditions. However, these valves cause a pressure drop in the suction line, which is detrimental to the system capacity when operating in the cooling mode, when the presence of the throttling valve is not required.

It is an aim of this invention to eliminate the throttling valve while providing means to prevent an overload of the prime mover during any of the different modes of operation of the system.

SUMMARY OF THE INVENTION

In accordance with the invention, a transport refrigeration unit of the type which can provide either heating or cooling has a refrigeration system with a three-way valve adapted to supply hot gas from the compressor to either the condenser through a first line or the evaporator through a second or so-called hot gas line, the second line having a pressure regulating valve therein for limiting the evaporator pressure to a first predetermined value. A relief valve is connected between the first and second lines and operates, when the three-way valve is in a position to feed the second line, to pass refrigerant to the first line and the refrigerant condenser when the hot gas pressure exceeds a second, higher predetermined value. The system thus functions so that the values of both the evaporator pressure and discharge pressure are limited to prevent overloading of the compressor prime mover in heating and defrost operations.

BRIEF DESCRIPTION OF THE DRAWING

The single FIGURE is a schematic view of the main parts of a transport refrigeration system of one type incorporating the invention.

DESCRIPTION OF THE PREFERRED EMBODIMENT

In the drawing an interior space 10 in an insulated truck body 12 or the like is to be temperature conditioned by the refrigeration system adapted to selectively provide either cooling, or heating, or defrost. A refrigerant compressor 14 is driven by a prime mover 16, which may be either an internal combustion engine or in some cases an electric motor.

The compressor discharges hot gas through line 18 to a three-way valve 20 provided with a single inlet at 22 and first and second outlets 24 and 26, respectively.

The three-way valve is typically operated by a solenoid (not shown). In its first position it serves to connect the inlet 22 to the outlet 24 and block the outlet 26. In its second position the connection to the outlets is reversed with the outlet 24 being blocked while the flow is to the outlet 26. The solid line arrows indicate the path of flow of the refrigerant when the three-way valve 20 is in its first position and the unit is operating in a cooling mode. The dash line arrows indicate the path of flow when the three-way valve is in its second position and the unit is operating in either a heat or defrost mode. The only basic difference between the operation in a heat and defrost mode is that there is no forced air movement over the evaporator during the defrost cycle.

The first outlet 24 is connected through a refrigerant line 28 which, for purposes of this application is termed a first refrigerant line, to the refrigerant coil 30 which functions as a condenser in a cooling mode and which has its outlet in turn connected to receiver 32.

The second outlet 26 is connected to a second line 34 which is commonly called the hot gas line in the parlance of the trade. The hot gas line divides at a junction into two branches, one of which includes bypass line 36 leading to a bypass check valve 38 oriented to prevent flow from the receiver 32 into line 36.

The other branch of the hot gas line 34 includes line 40 leading to the pressure regulating valve 42. Refrigerant leaving the pressure regulating valve passes through the defrost pan heater 44, then to the distributor 46, and then to the coil 48 which functions as an evaporator in a cooling mode.

The outlet of the evaporator 48 is connected through line 50 to a heat exchanger 52 which is internally compartmented so that refrigerant entering through line 50 leaves through line 54. That refrigerant then passes to accumulator 56 and through the suction line 58 back to the compressor 14.

The remainder of the refrigeration circuit includes the liquid line 60 leaving the receiver 32 and carrying refrigerant to dehydrator 62, line 64 connected to the heat exchanger 52, and line 66 connected to the expansion valve 68, the outlet of which is connected to the distributor 46.

The pressure regulating valve 42 is provided with means for sensing the evaporator or suction gas pressure, such as the sensor 70 connected to line 50 leaving the evaporator. The pressure regulating valve is set or adjusted to control the amount of refrigerant passing to the evaporator therethrough, so that the amount does not exceed that which would result in a predetermined maximum value of evaporator pressure.

The expansion valve 68 is of the pressure limiting type as noted, and accordingly is provided with its own sensor or feeler bulb 72 which also reflects the evaporator pressure in the line 50 leaving the evaporator. The expansion valve functions to control evaporator pressure only in a cooling mode.

Finally, in accordance with the invention, the system includes a pressure relief valve 74 connected between the first line 28 and the hot gas line 34. It is operable, when the three-way valve 20 is in the second position corresponding to heating or defrost, to pass refrigerant from the hot gas line 34 to the first line 28 and the condenser 30 when the hot gas discharge pressure exceeds a second, predetermined value, which is of course relatively high with respect to typical suction pressures. The valve 74 preferably operates to control on the inlet pressure, although it may alternatively be of the type which controls in accordance with the differential across the valve.

OPERATION

The operation of the unit in the cooling mode is generally conventional with hot refrigerant gas from the compressor diverted by the three-way valve 20 to the condenser 30 where the refrigerant gives up much of its heat and changes into a liquid passed into the receiver 32. The liquid refrigerant then passes from the receiver as indicated by the solid line arrows to the heat exchanger 52 where it gives some of its sensible heat to the suction vapor passing separately through the heat exchanger. Then the liquid refrigerant passed through the expansion valve 68 where it drops in pressure and generally vaporizes to pass mostly as a gas to the evaporator 48. There the refrigerant picks up heat and then passes as a suction gas back through the heat exchanger 52 to the accumulator 56 from which it subsequently passes through the suction line 58 back to the compressor. The expansion device 68 is of the pressure limiting type so that it functions in a cooling mode to prevent an excess suction pressure which could result in overloading of the prime mover.

In the heat and defrost cycles the hot discharge gas from the compressor is routed through the three-way valve 20 in a second position into the hot gas line 34 with most of the hot gas being directed to the pressure regulating valve 42, while a minor portion of it passes through the bypass line 36 to the check valve 38 into the receiver tank 32. The hot gaseous refrigerant flowing through the regulating valve passes through the defrost pan heater 44 and the distributor 46 to the evaporator 48 where it provides heat for the air passing thereby in a heating cycle, and provides defrost heat during a cooling cycle.

To assure that sufficient refrigerant charge is available in the refrigerant circuit during the heat or defrost mode the receiver tank (32) is pressurized through line 36. The pressure on the liquid in the receiver tank 42 forces some of the liquid through the liquid line 60, and heat exchanger 52 to the expansion valve 68. The expansion valve 68 is provided with a bypass passage through which the liquid passes to the distributor 46 and joins the hot refrigerant gas passing to the evaporator coil 48. All the refrigerant leaving the evaporator passes back to the compressor in the same path as in the cooling cycle, but with the accumulator 56 functioning as an evaporator as is conventional in such systems.

An overload of the prime mover is avoided in accordance with the invention by the provision of the pressure regulating valve 42 and the relief valve 74 functioning in the following way in the heat and defrost cycles. The pressure regulating valve 42 responds to the suction pressure to limit the amount of refrigerant passing through the valve to that which prevents the suction pressure from exceeding a certain value beyond a limited time. Increasing suction pressures will normally result in increasing discharge pressures in a bootstrapping operation.

The relief valve 74, responding to an excessive discharge pressure at its inlet, will dump some of the refrigerant through the valve to the line 28 and the condenser 30.

Thus the arrangement of the invention controls against excessive suction pressure and excessive compressor discharge pressure to avoid an overload condition of the prime mover. This is accomplished with the elimination of a throttling valve in the suction line to the compressor, so as to avoid any penalty the presence of such a throttling valve imposes.

I claim:

1. In a transport refrigeration unit of the type adapted to selectively provide either cooling or heating, a refrigeration system including:

a three-way valve having an inlet, and first and second outlets;

a refrigerant compressor having a discharge line connected to supply said three-way valve;

a refrigerant condenser;

a refrigerant evaporator;

first refrigerant line means connecting the first outlet of said three-way valve to said condenser for operation of the system in a cooling mode when said three-way valve is in a first position;

hot gas refrigerant line means connecting the second outlet of said three-way valve for passage of hot gas to said evaporator in operation of the system in a heating or defrost mode when said three-way valve is in said second position;

a pressure regulating valve in said hot gas line means to control refrigerant amounts to limit evaporator pressure to a first predetermined value;

a relief valve connected between said first line means and said hot gas line means and operable, when said three-way valve is in said second position, to pass refrigerant to said first line and said condenser when the hot gas pressure exceeds a second predetermined value;

whereby the values of both evaporator pressure and discharge pressure are limited to prevent overloading in heating and defrost operations.

2. In a unit according to claim 1 wherein:

said system includes a refrigerant expansion device of the pressure limiting type for limiting suction pressure, and operable in a cooling mode to prevent overloading.

3. A unit according to claim 1 wherein:

said pressure regulating valve is responsive to the suction pressure leaving said evaporator.

* * * * *